United States Patent
Lall et al.

(10) Patent No.: US 11,241,626 B2
(45) Date of Patent: Feb. 8, 2022

(54) SYSTEMS AND METHODS TO CONTROL MOVEMENT BASED ON A RACE EVENT

(71) Applicant: Zynga Inc., San Francisco, CA (US)

(72) Inventors: Arjun Bharat Lall, San Francisco, CA (US); Abhinav Agrawal, San Francisco, CA (US)

(73) Assignee: Zynga Inc., San Francisco, CA (US)

(*) Notice: Subject to any disclaimer, the term of this patent is extended or adjusted under 35 U.S.C. 154(b) by 718 days.

(21) Appl. No.: 14/502,085

(22) Filed: Sep. 30, 2014

(65) Prior Publication Data
US 2015/0099566 A1 Apr. 9, 2015

Related U.S. Application Data

(60) Provisional application No. 61/886,486, filed on Oct. 3, 2013.

(51) Int. Cl.
*A63F 13/67* (2014.01)
*A63F 13/803* (2014.01)
*A63F 13/56* (2014.01)

(52) U.S. Cl.
CPC .............. *A63F 13/67* (2014.09); *A63F 13/56* (2014.09); *A63F 13/803* (2014.09)

(58) Field of Classification Search
CPC ......... A63F 13/67; A63F 13/56; A63F 13/803
See application file for complete search history.

(56) References Cited

U.S. PATENT DOCUMENTS

2004/0266506 A1* 12/2004 Herbrich ............... A63F 13/12
463/6
2005/0233791 A1* 10/2005 Kane ..................... A63F 13/12
463/6

OTHER PUBLICATIONS

Retro Monday—Mario Kart 64 Review Uploaded by kNIGHTWINGO1 Dec. 19, 2011 https://www.youtube.com/watch?v=weKVbr4XMmU.*

* cited by examiner

*Primary Examiner* — Tramar Harper
*Assistant Examiner* — Jeffrey K Wong
(74) *Attorney, Agent, or Firm* — Schwegman Lundberg & Woessner, P.A.

(57) ABSTRACT

A system, a non-transitory machine-readable storage medium storing instructions, and a computer-implemented method to control movement of a non-player character is provided. Actions of a player character in a race event of a multiplayer game are detected. A player character movement model based on the actions of the player character is generated. A set of non-player actions is generated in a non-player character movement model based on the player character movement model. A movement of a non-player character in the multiplayer game is controlled based on the set of non-player actions in the non-player character movement model.

9 Claims, 10 Drawing Sheets

SYSTEMS AND METHODS TO CONTROL MOVEMENT BASED ON A RACE EVENT

CROSS-REFERENCE TO RELATED APPLICATIONS

This application claims the priority benefit of U.S. Provisional Application No. 61/886,486, filed Oct. 3, 2013, which is incorporated herein by reference in its entirety.

TECHNICAL FIELD

The present disclosure generally relates to games and applications and, in particular embodiments, to computer-implemented multiplayer games, such as online social games hosted on a game server. In an example embodiment, a non-player character movement model is generated that includes a set of non-player actions.

BACKGROUND

In many games, there is a virtual world or some other imagined playing space where a player/user of the game controls one or more player characters (herein "character," "player character," or "PC"). Player characters can be considered in-game representations of the controlling player. As used herein, the terms "player," "user," "entity," and "friend" may refer to the in-game player character controlled by that player, user, entity, or friend, unless context suggests otherwise. The game display can display a representation of the player character. A game engine accepts inputs from the player, determines player character actions, decides outcomes of events and presents the player with a game display illuminating what happened. In some games, there are multiple players, wherein each player controls one or more player characters.

In many computer games, there are various types of in-game assets (aka "rewards" or "loot") that a player character can obtain within the game. For example, a player character may acquire game points, gold coins, experience points, character levels, character attributes, virtual cash, game keys, or other in-game items of value. In many computer games, there are also various types of in-game obstacles that a player must overcome to advance within the game. In-game obstacles can include tasks, puzzles, opponents, levels, gates, actions, etc. In some games, a goal of the game may be to acquire certain in-game assets, which can then be used to complete in-game tasks or to overcome certain in-game obstacles. For example, a player may be able to acquire a virtual key (i.e., the in-game asset) that can then be used to open a virtual door (i.e., the in-game obstacle).

An electronic social networking system typically operates with one or more social networking servers providing interaction between users such that a user can specify other users of the social networking system as "friends." A collection of users and the "friend" connections between users can form a social graph that can be traversed to find second, third and more remote connections between users, much like a graph of nodes connected by edges can be traversed.

Many online computer games are operated on an online social network. Such a network allows both users and other parties to interact with the computer games directly, whether to play the games or to retrieve game- or user-related information. Internet users may maintain one or more accounts with various service providers, including, for example, online game networking systems and online social networking systems. Online systems can typically be accessed using browser clients (e.g., Firefox, Chrome, Internet Explorer).

In many computer games, there are various types of in-game actions that a player character can make within the game. For example, a player character in an online role-playing game may be able to interact with other player characters, build a virtual house, attack enemies, go on a quest, go to a virtual store to buy/sell virtual items, etc. A player character in an online poker game may be able to play at specific tables, place bets of virtual currency for certain amounts, play or fold certain hands, play in a online poker tournament, etc.

DESCRIPTION OF EXAMPLE EMBODIMENTS

A non-player character of a multiplayer game may be controlled using a non-player character movement model. The non-player character movement model may include a set of non-player actions used to control the non-player character. In some instances, the non-player actions are based on player-controlled actions performed by a player character in a race event. In some instances, the non-player actions are action variants of the actions performed by the player character in the race event.

Figure 1:
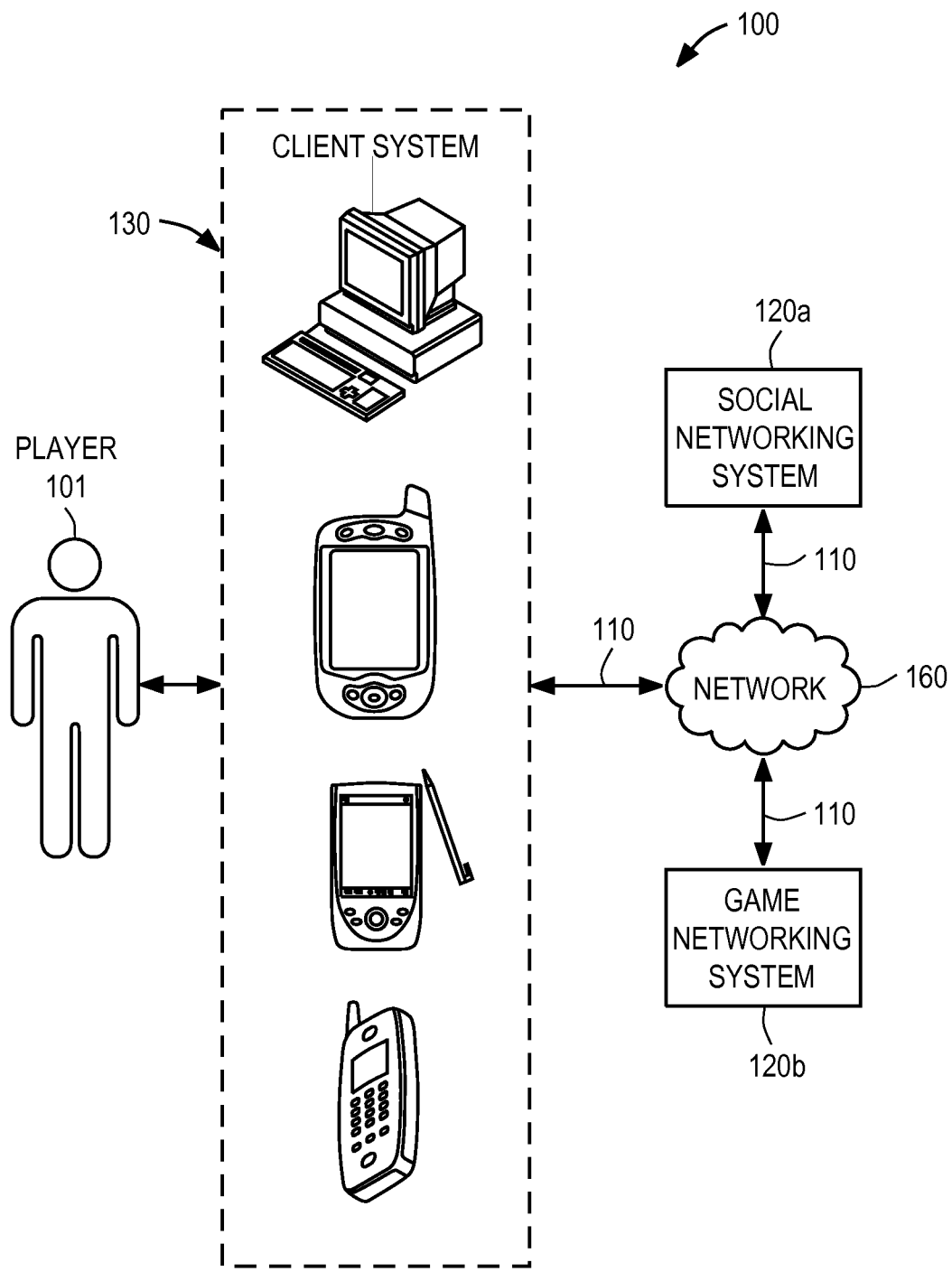
FIG. 1 is a schematic diagram showing an example of a system, according to some example embodiments.

FIG. 1 illustrates an example of a system for implementing various disclosed embodiments. In particular embodiments, system 100 comprises player 101, social networking system 120a, game networking system 120b, client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social network system 120a is a network-addressable computing system that can host one or more social graphs. Social networking system 120a can generate, store, receive, and transmit social networking data. Social network system 120a can be accessed by the other components of system 100 either directly or via network 160. Game networking system 120b is a network-addressable computing system that can host one or more online games. Game networking system 120b can generate, store, receive, and transmit game-related data, such as, for example, game account data, game input, game state data, and game displays. Game networking system 120b can be accesses by the other components of system 100 either directly or via network 160. Player 101 may use client system 130 to access, send data to, and receive data from social network system 120a and game networking system 120b. Client system 130 can access social networking system 120 or game networking system 120b directly, via network 160, or via a third-party system. As an example and not by way of limitation, client system 130 may access game networking system 120b via social networking system 120a. Client system 130 can be any suitable computing device, such as a personal computer, laptop, cellular phone, smart phone, computing tablet, etc.

Although FIG. 1 illustrates a particular number of players 101, social network systems 120a, game networking systems 120b, client systems 130, and networks 160, this disclosure contemplates any suitable number of players 101, social network systems 120a, game networking systems 120b, client systems 130, and networks 160. As an example and not by way of limitation, system 100 may include one or more game networking systems 120b and no social networking systems 120a. As another example and not by way of limitation, system 100 may include a system that comprises both social networking system 120a and game networking system 120b. Moreover, although FIG. 1 illustrates a particular arrangement of player 101, social network system 120a, game networking system 120b, client system 130, and network 160, this disclosure contemplates any suitable arrangement of player 101, social network system 120a, game networking system 120b, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social network system 120a, game networking system 120b, client system 130, and network 160, this disclosure contemplates any suitable connections between player 101, social network system 120a, game networking system 120b, client system 130, and network 160. As an example and not by way of limitation, in particular embodiments, client system 130 may have a direct connection to social network system 120a or game networking system 120b, bypassing network 160.

Online Games and Game Systems

Game Networking Systems

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including non-player characters (NPCs), and in-game objects. The game engine also manages game state, including player character state for currently active (online) and inactive (offline) players.

An online game can be hosted by game networking system 120b, which can be accessed using any suitable connection with a suitable client system 130. A player may have a game account on game networking system 120b, wherein the game account can contain a variety of information associated with the player (e.g., the player's personal information, financial information, purchase history, player character state, game state). In some embodiments, a player may play multiple games on game networking system 120b, which may maintain a single game account for the player with respect to all the games, or multiple individual game accounts for each game with respect to the player. In some embodiments, game networking system 120b can assign a unique identifier to each player 101 of an online game hosted on game networking system 120b. Game networking system 120b can determine that a player 101 is accessing the online game by reading the user's cookies, which may be appended to HTTP requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmitting user inputs or other events to the game engine, and receive instructions from the game engine. The game engine can be executed on any suitable system (such as, for example, client system 130, social networking system 120a, or game networking system 120b). As an example and not by way of limitation, client system 130 can download client components of an online game, which are executed locally, while a remote game server, such as game networking system 120b, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 120b.

Game Systems, Social Networks, and Social Graphs:

In an online multiplayer game, players may control player characters (PCs), a game engine controls non-player characters (NPCs) and game features, and the game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), etc. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, player 101 may access particular game instances of an online game. A game instance is copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure any suitable social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within $N_{max}$ degrees of the player, where $N_{max}$ is the maximum degree of separation allowed by the system managing the social graph (such as, for example, social networking system 120a or game networking system 120b). In one embodiment, $N_{max}$ equals 1, such that the player's social network includes only first-degree friends. In another embodiment, $N_{max}$ is unlimited and the player's social network is coextensive with the social graph.

In particular embodiments, the social graph is managed by game networking system 120b, which is managed by the game operator. In other embodiments, the social graph is part of a social networking system 120a managed by a third-party (e.g., Facebook, Friendster, Myspace). In yet other embodiments, player 101 has a social network on both game networking system 120b and social networking system 120a, wherein player 101 can have a social network on the game networking system 120b that is a subset, superset, or independent of the player's social network on social networking system 120a. In such combined systems, game network system 120b can maintain social graph information with edge type attributes that indicate whether a given friend is an "in-game friend," an "out-of-game friend," or both. The various embodiments disclosed herein are operable when the social graph is managed by social networking system 120a, game networking system 120b, or both.

Figure 2:
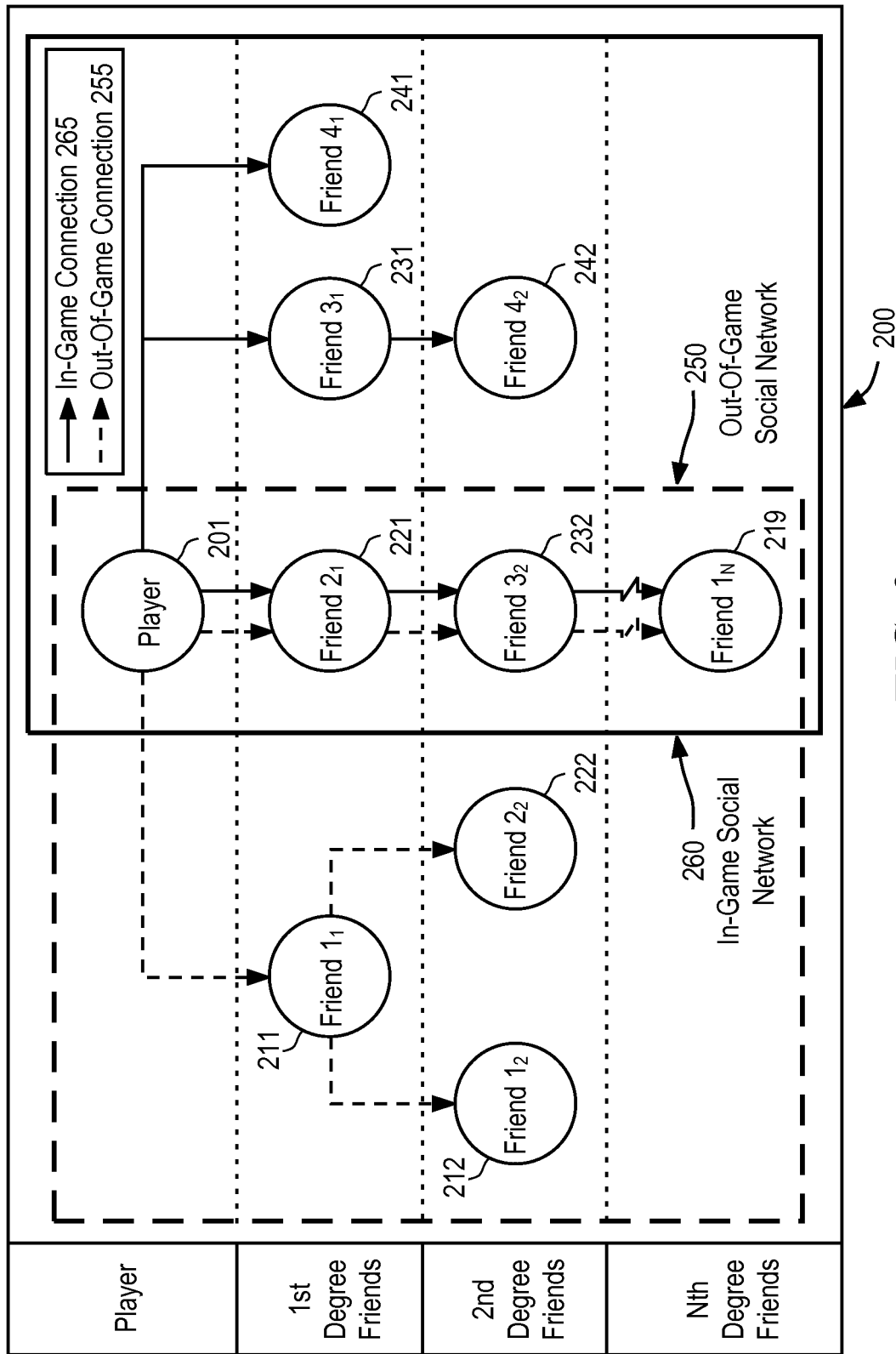
FIG. 2 is a schematic diagram showing an example of a social network within a social graph, according to some embodiments.

FIG. 2 shows an example of a social network within a social graph. As shown, Player 201 can be associated, connected or linked to various other users, or "friends," within the social network 250. These associations, connections or links can track relationships between users within the social network 250 and are commonly referred to as online "friends" or "friendships" between users. Each friend or friendship in a particular user's social network within a social graph is commonly referred to as a "node." For purposes of illustration and not by way of limitation, the details of social network 250 will be described in relation to Player 201. As used herein, the terms "player" and "user" can be used interchangeably and can refer to any user or character in an online multiuser game system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In social network 250, Player 201 has two first-degree friends. That is, Player 201 is directly connected to Friend $1_1$ 211 and Friend $2_1$ 221. In a social graph, it is possible for individuals to be connected to other individuals through their first-degree friends (i.e., friends of friends). As described above, each edge required to connect a player to another user is considered the degree of separation. For example, FIG. 2 shows that Player 201 has three second-degree friends to which he is connected via his connection to his first-degree friends. Second-degree Friend $1_2$ 212 and Friend $2_2$ 222 are connected to Player 201 via his first-degree Friend $1_1$ 211. The limit on the depth of friend connections, or the number of degrees of separation for associations, that Player 201 is allowed is typically dictated by the restrictions and policies implemented by social networking system 120a.

In various embodiments, Player 201 can have Nth-degree friends connected to him through a chain of intermediary degree friends as indicated in FIG. 2. For example, Nth-degree Friend $1_N$ 219 is connected to Player 201 via second-degree Friend $3_2$ 232 and one or more other higher-degree friends. Various embodiments may take advantage of and utilize the distinction between the various degrees of friendship relative to Player 201.

In particular embodiments, a player (or player character) can have a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in his out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in his in-game social network 260. In some embodiments, it is possible for a friend to be in both the out-of-game social network 250 and the in-game social network 260. Here, Friend $2_1$ 221 has both an out-of-game connection 255 and an in-game connection 265 with Player 201, such that Friend $2_1$ 221 is in both Player 201's in-game social network 260 and Player 201's out-of-game social network 250.

As with other social networks, Player 201 can have second-degree and higher-degree friends in both his in-game and out of game social networks. In some embodiments, it is possible for Player 201 to have a friend connected to him both in his in-game and out-of-game social networks, wherein the friend is at different degrees of separation in each network. For example, if Friend $2_2$ 222 had a direct in-game connection with Player 201, Friend $2_2$ 222 would be a second-degree friend in Player 201's out-of-game social network, but a first-degree friend in Player 201's in-game social network. In particular embodiments, a game engine can access in-game social network 260, out-of-game social network 250, or both.

In particular embodiments, the connections in a player's in-game social network can be formed both explicitly (e.g., users must "friend" each other) and implicitly (e.g., system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

Non-Player Character Movement Model

Figure 3:
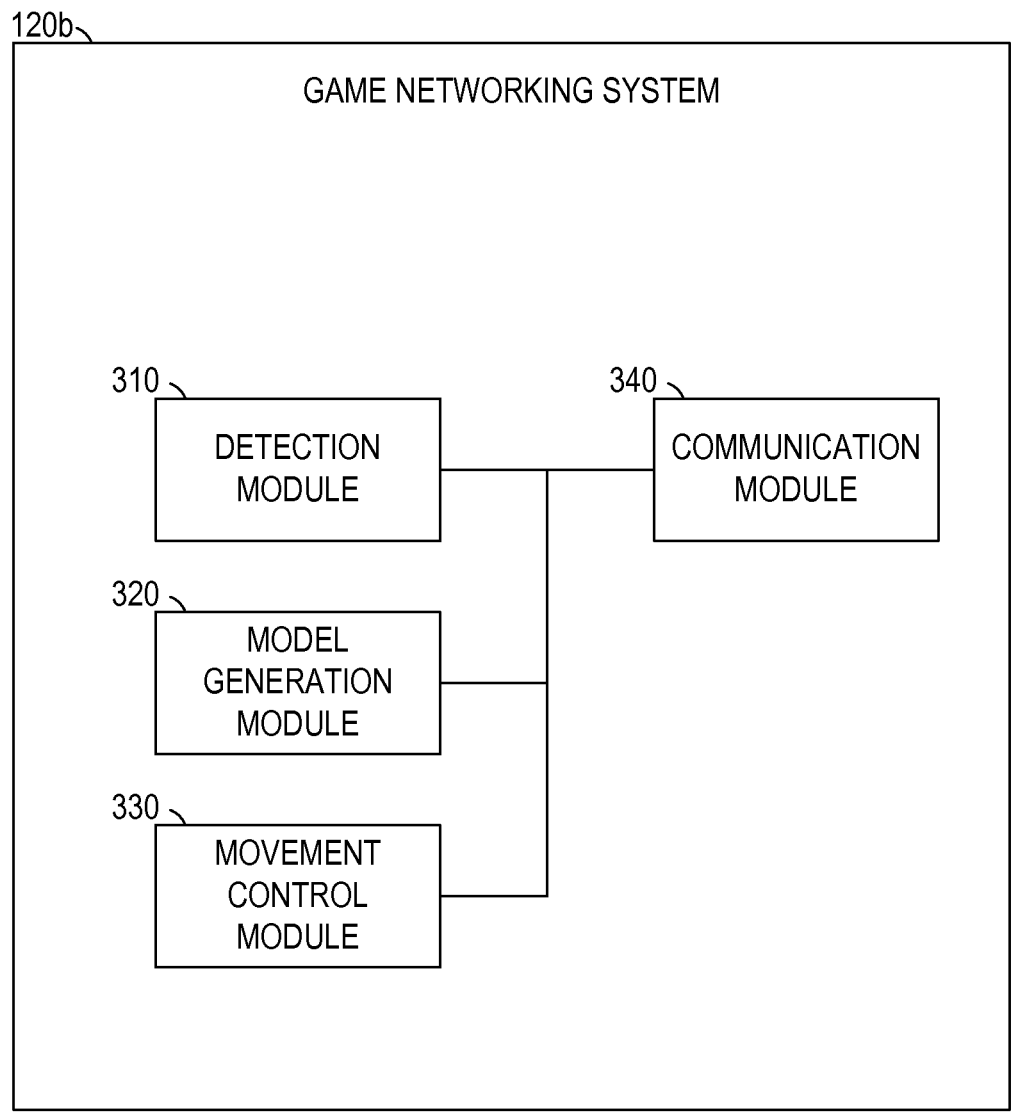
FIG. 3 is a block diagram illustrating components of a game networking system, according to some example embodiments.

FIG. 3 is a block diagram illustrating components of a game networking system, according to some example embodiments. The game networking system 120b may include a detection module 310, a model generation module 320, a movement control module 330, and a communication module 340.

In various example embodiments, the detection module 310 is configured to detect player-controlled actions of a player character in a race event of a multiplayer game. Player character control may be affected via a client device used by a player uniquely associated with the player character. In other words, the game networking system 120b may receive data from the client device operated by the player. The data may pertain to the actions of the player character in the race event. Moreover, a client component of the multiplayer game may be downloaded onto the client device and executed locally by the client device. Thereafter, the client device may send the actions of the player character to the game networking system 120b. In other words, the client device is in communication with the game networking system 120b while the multiplayer game is being executed on the client device. The multiplayer game may be a racing game that offers a variety of courses that are made available to the player. The race event may correspond to a specific course featured in the multiplayer game. The course may include a track that is of a predetermined length. Furthermore, the race event may last for a predetermined duration of time.

In various example embodiments, the model generation module 320 is configured to generate a player character movement model based on the actions of the player character in the race event of the multiplayer game. The actions of the player character in the race event may include a path traveled by the player character within the track for the race event, speed of the player character in the race event, maneuvers performed by the player character in the race event, game items collected by the player character in the race event, a race completion time of the player character in the race event, and the like. Moreover, because the race event lasts for the predetermined duration of time, the generated player character movement model may characterize the movement of the player character for the predetermined duration of time.

In various example embodiments, the model generation module 320 is further configured to generate a set of non-player actions in a non-player character movement model based on the player character movement model. The set of non-player actions may include the actions of the player character in the race event. Therefore, the model generation module 320 may be further configured to add the actions of the player character to the set of non-player actions in the non-player character movement model.

In various example embodiments, the model generation module 320 is further configured to generate action variants that are modifications to the actions of the player character in the race event. In various example embodiments, the model generation module 320 is further configured generate the action variants by modifying the actions of the player character that are characterized by the player character movement model. Modifying the actions of the player character may include altering the path traveled by the player character to create an alternative path, increasing or decreasing the speed of the player character, changing one or more attributes of at least some of the maneuvers performed by the player character, changing the game items collected by the player character, modifying the completion time of the player character, and the like.

In various example embodiments, the model generation module 320 is further configured to add the generated action variants to the set of non-player actions in the non-player character movement model. Therefore, the set of non-player actions in the non-player character movement model in such embodiments includes both the actions of the player character as well as the generated action variants.

In various example embodiments, the movement control module 330 is configured to control movement of a non-player character in the multiplayer game based on the set of non-player actions in the non-player character movement model. The movement control module 330 may choose or select from the set of non-player actions in the non-player character movement model a group of non-player actions for use in modeling automated behavior of the non-player character. The selected group of actions may thus be used by the movement control module 330 to control the movement of the non-player character, for example during a further race event played by the player. The selected group may be the entire set of non-player actions. Alternatively, the selected group may be a subset of non-player actions in the non-player character movement model. Also, since both the action variants and the actions of the player character were added by the model generation module 320 to the set of non-player actions, the set of non-player actions may in some instances include both the action variants and the actions of the player character in the race event. The movement control module 330 may therefore select certain action variants and certain actions of the player character in order to control movement of the non-player character. For example, the movement control module 330 may select the same completion time of the player character but also select an alternate path to control the movement of the non-player character. This causes the non-player character to finish the course in the same time as the player character but on a different path than the player character. The movement control module 330 may select the same path of the player character but also choose a different speed to control movement of the non-player character. This causes the non-player character to travel on the same path as the player character but finish the course faster than the player character. In various example embodiments, the movement control module 330 is further configured to control the movement of the non-player character in a further race event of the multiplayer game. As further explained below, the further race event may be a subsequent race on the same course.

In various example embodiments, the communication module 340 is further configured to receive a request to begin a further race event of the multiplayer game. As stated previously, the race event may correspond to a specific course featured in the multiplayer game. The further race event may therefore be a subsequent race on the same specific course. The request may be received from the client device operated by the player. Moreover, the communication module 340 may be further configured to display the non-player character and a further player character in the further race event of the multiplayer game. This allows the player to use the further player character to race against the non-player character. In other words, the player may be racing against a computer which performs actions that are modeled off the actions taken by the player character in a previous race or in the prior occurring race event. Accordingly, the communication module 340 may be further configured to show the non-player character and the player character in head-to-head competition in the further race event.

Accordingly, the movement control module 330 may be further configured to display the movement of the non-player character in the further race event of the multiplayer game. In various example embodiments, the movement control module 330 is further configured to display the non-player character as performing the set of non-player actions in the non-player character movement model. In the case that a subset of the non-player actions are selected, the movement control module 330 is further configured to display the non-player character as performing the selected subset of the non-player actions in the non-player character movement model.

Figure 4:
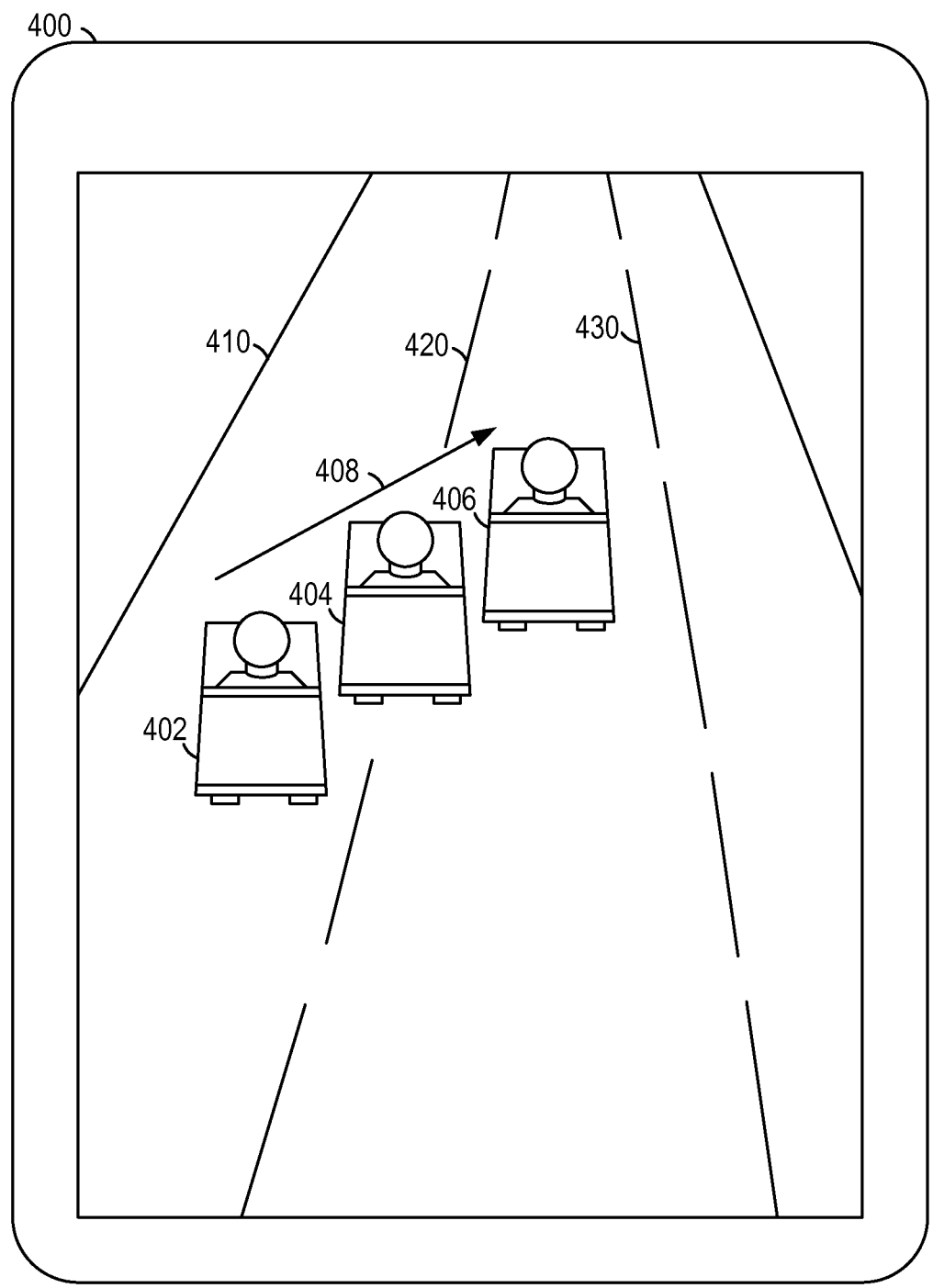
FIGS. 4-6 are examples of a game interface for a computer-implemented multiplayer game, according to some example embodiments.

FIG. 4 is an example of a game interface for a multiplayer game, according to some example embodiments. The game interface 400 may be of a race event that is displayed on a client device operated by a player. The client device may be executing a multiplayer game that includes player characters 402, 404, and 406. Each of the player characters may 402, 404, and 406 may be displayed on the game interface at a particular moment. For instance, the player character 402 may displayed during a first moment. The player character 404 may be displayed during a second moment. Moreover, the player character 406 may be displayed during a third moment. Therefore, the player characters 402, 404, and 406 may be displayed in succession. The player may move a player character in an upward direction, as shown by the arrow 408, thereby causing the player characters 402, 404, and 406 to be displayed in the game user interface 400 in succession. The movement may also cause the player character to move from a left lane to a center lane. Boundaries of the left lane are shown by markers 410 and 420. Boundaries of the center lane are shown by markers 420 and 430. Moreover, the movement of the player character in the upward direction from the left lane to the center lane may be added to a set of non-player actions in a non-player character movement model.

Figure 5:
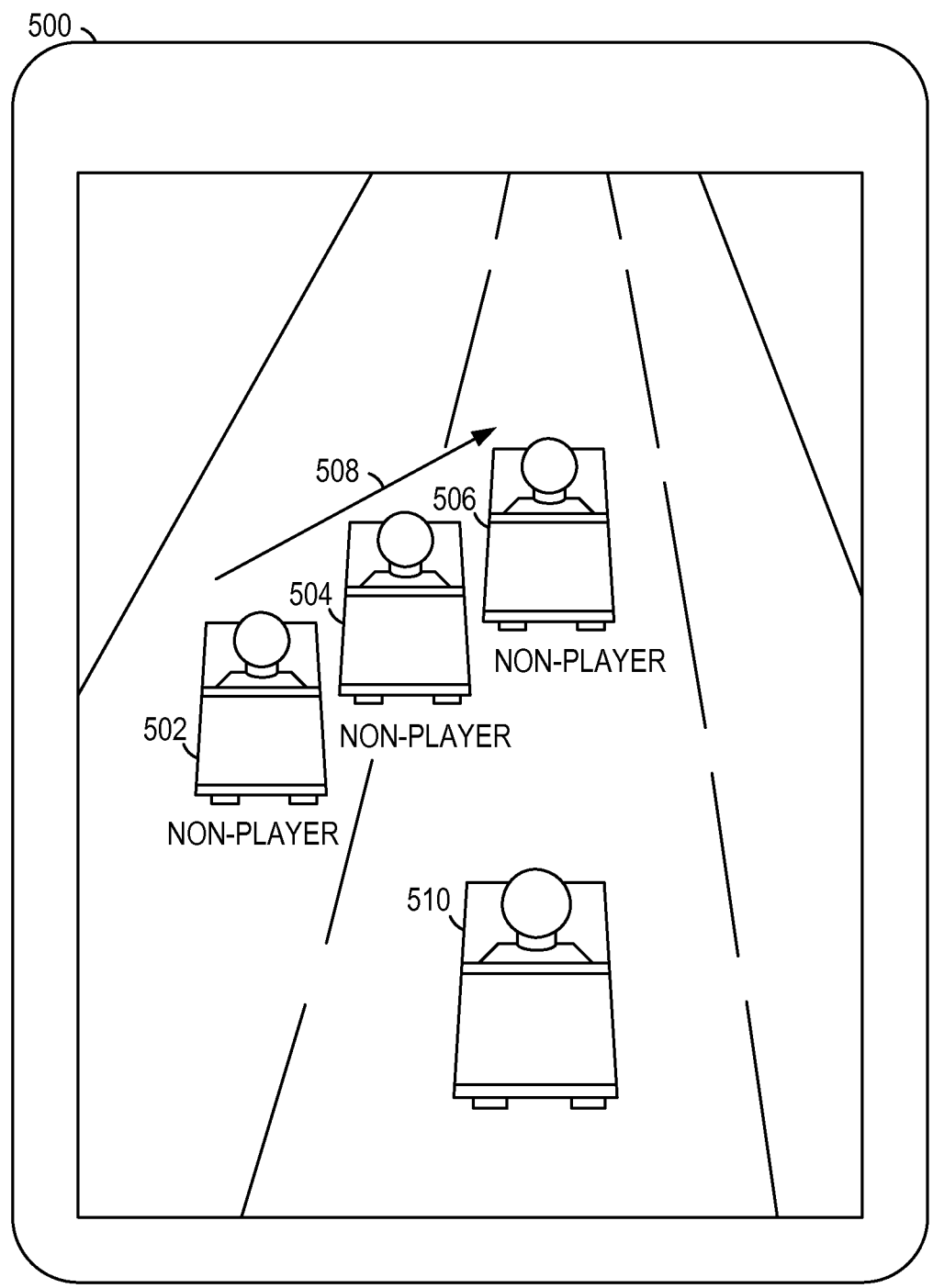

FIG. 5 is an example of a game interface for a multiplayer game, according to some example embodiments. The game interface 500 may be displayed on a client device that is operated by a player. The client device may be executing a multiplayer game that includes non-player characters 502, 504, and 506 and player character 510. A non-player character may be moved in an upward direction, as shown by the arrow 508, thereby causing the non-player characters 502, 504, and 506 to be displayed in the game user interface 500 in succession. Further, the movement of the non-player character may be based on the movement of the player character in FIG. 4. The game interface 500 may also correspond to a further race event that occurs subsequently to the race event displayed in FIG. 4. The player character 510 may be controlled by a player operating a client device. Whereas the non-player character 502, 504, and 506 may be a computer that is not being controlled by a player but instead is performing actions according to the non-player character movement model.

Figure 6:
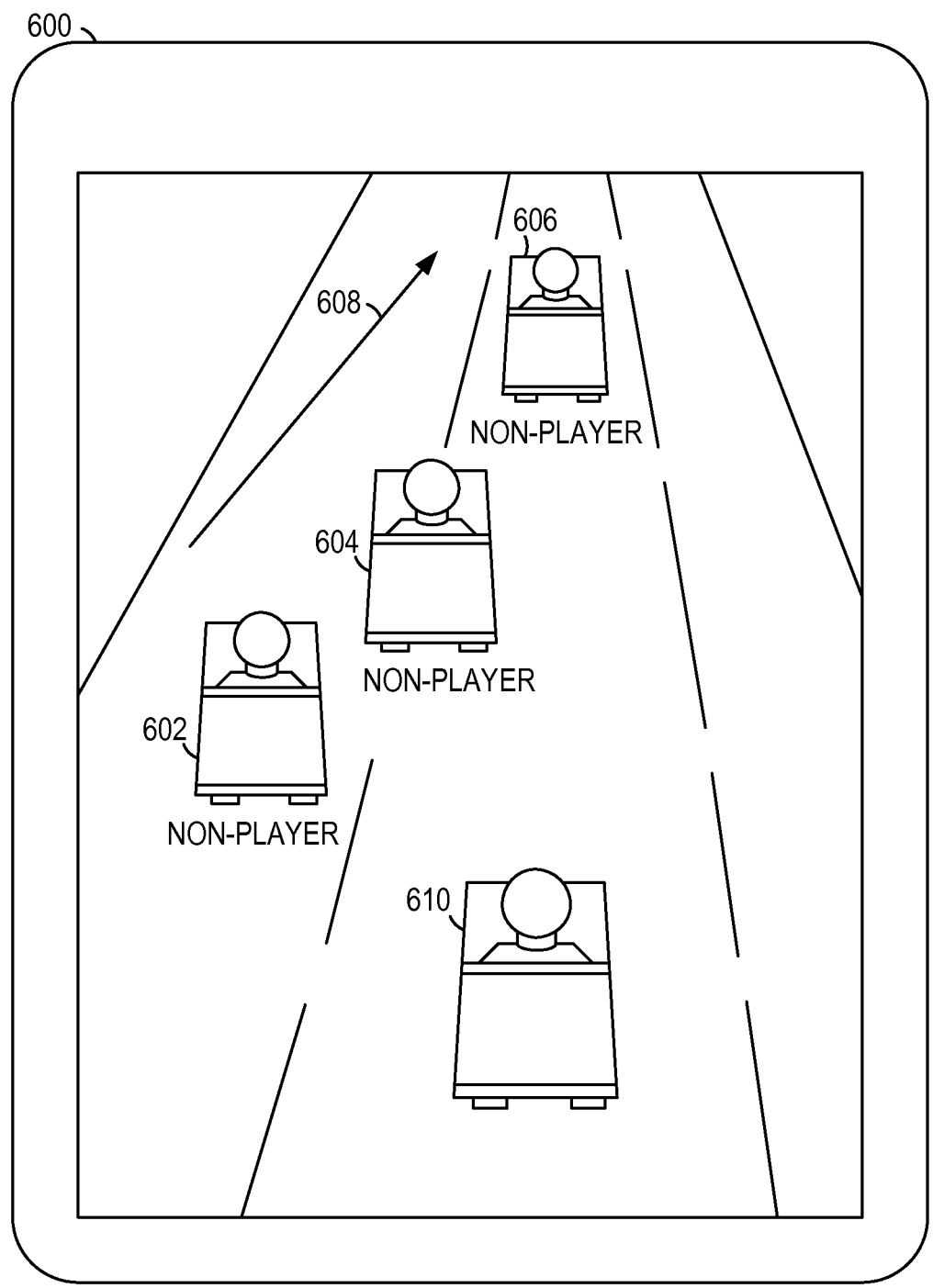

FIG. 6 is an example of a game interface for a multiplayer game, according to some example embodiments. The game interface 600 may be displayed on a client device that is operated by a player. The client device may be executing a multiplayer game that includes non-player characters 602, 604, and 606 and player character 610. The non-player characters 602, 604, and 606 may be moved in an upward direction, as shown by the arrow 608, based on the action performed by the player that caused the player characters 402, 404, and 406 to be displayed in FIG. 4. However, the movement of the non-player character may be an action variant of the movement of the player character in FIG. 4. Therefore, a direction of the arrow 608 is different than a direction of the arrow 408. As such, the non-player character is moved according to the action variant, causing the non-player characters 602, 604, and 606 to be displayed in succession in FIG. 6. The game interface 600 may also correspond to a further race event that occurs subsequently to the race event displayed in FIG. 4. The player character 610 may be controlled by a player operating a client device. Whereas the non-player character 602, 604, and 606 may be a computer that is not being controlled by a player but instead is performing actions according to the non-player character movement model.

Figure 7:
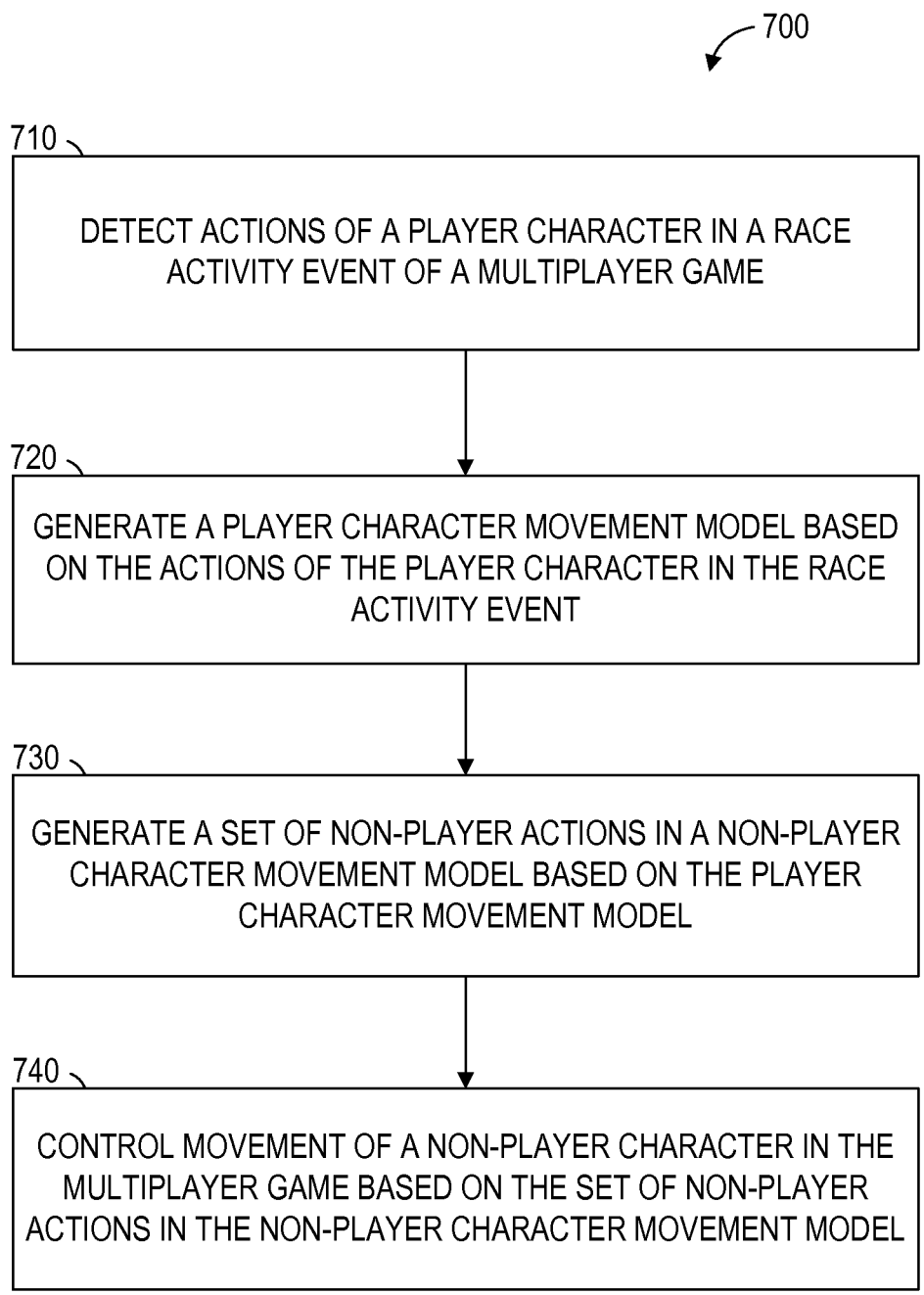
FIGS. 7-8 are flowcharts showing an example method of controlling movement of a non-player character based on a non-player character movement model, according to some example embodiments.

FIG. 7 is a flowchart showing an example method 700 of controlling movement of a non-player character based on a non-player character movement model, according to some example embodiments. Operations in method 700 may be performed by the game networking system 120b. As shown in FIG. 7, the method 700 includes operations 710, 720, 730, and 740.

At operation 710, the detection module 310 detects actions of a player character in a race event of a multiplayer game. The player character may be controlled by a player via a client device. The multiplayer game may be a racing game that offers a variety of courses that are made available to the player. The race event may correspond to a specific course featured in the multiplayer game.

At operation 720, the model generation module 320 generates a player character movement model that based on the actions of the player character in the race event of the multiplayer game. The actions of the player character in the race event may include a path traveled by the player character within the track for the race event, speed of the player character in the race event, maneuvers performed by the player character in the race event, game items collected by the player character in the race event, a completion time of the player character in the race event, and the like. In other words, the player character movement model may characterize the actions of the player character in the race event. In some instances, the player character movement model may be stored in a database by the model generation module 320.

At operation 730, the model generation module 320 generates a set of non-player actions in a non-player character movement model based on the player character movement model. The set of non-player actions may include the actions of the player character in the race event. The set of non-player actions may also include action variants of the actions of the player character in the race event.

At operation 740, the movement control module 330 controls movement of a non-player character in the multiplayer game based on the set of non-player actions in the non-player character movement model. The movement control module 330 may display the non-player character as performing the set of non-player actions in the non-player character movement model.

Figure 8:
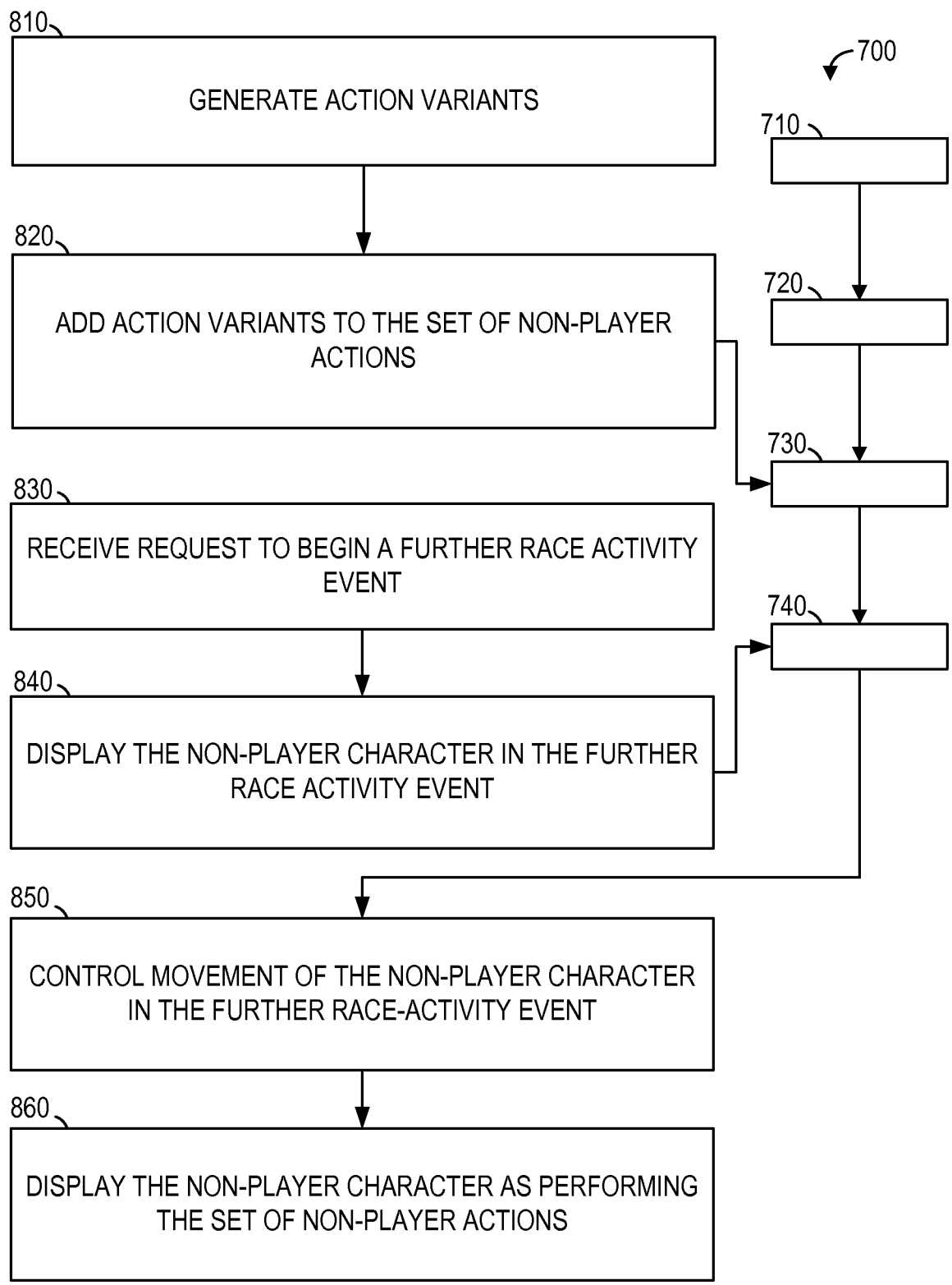

As shown in FIG. 8, the method 700 includes operations 810, 820, 830, 840, 850, and 860. The operations 810, 820, 830, 840, 850, and 860 may be performed by the game networking system 120b. Operations 810 and 820 may be performed as part of operation 730. Operations 830, 840, 850, and 860 may be performed around operation 740.

At operation 810, the movement control module 330 generates action variants that are modifications to the actions of the player character in the race event.

At operation 820, the movement control module 330 adds the generated action variants to the set of non-player actions in the non-player character movement model.

At operation 830, the communication module 340 receives a request to begin a further race event of the multiplayer game. As stated previously, the further race event may be a subsequent race on the same course. Moreover, the request may be received from a client device operated by a player.

At operation 840, the communication module 340 displays the non-player character in the further race event. The non-player character may be displayed in the further race event on the client device operated by the player. Moreover, a further player character may also be displayed as being in the further race event on the client device. The further player character may be controlled by the player via the client device. Whereas the non-player character may be a computer player controlled by the movement control module 330. Further, the non-player character and the player character may be shown in head-to-head competition in the further race event.

At operation 850, the movement control module 330 controls movement of the non-player character in the further race event.

At operation 860, the movement control module 330 displays the non-player character as performing the set of non-player actions in the non-player character movement model.

Data Flow

Figure 9:
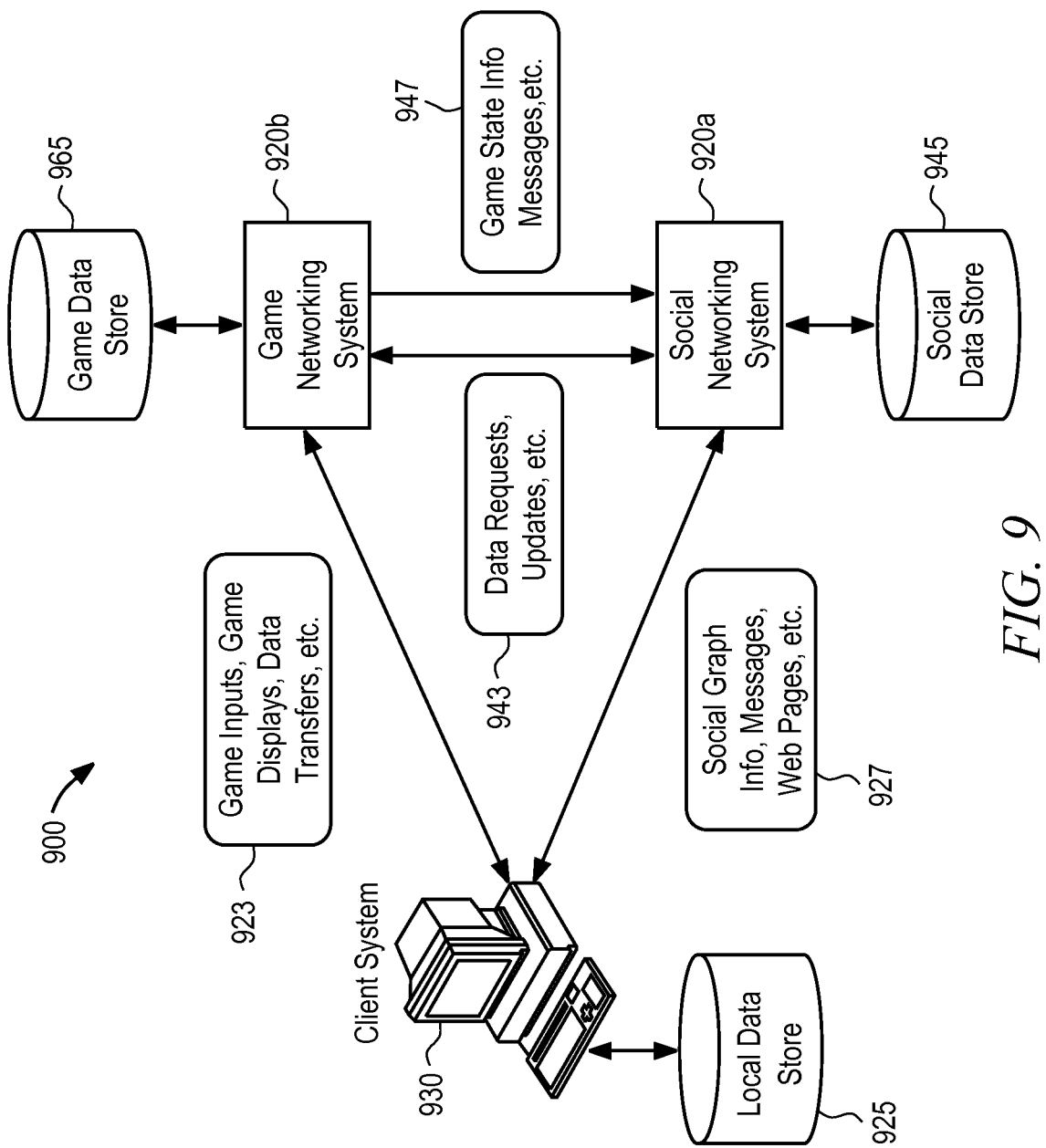
FIG. 9 is a diagrammatic representation of an example data flow between example components of the example system of FIG. 1, according to some example embodiments.

FIG. 9 illustrates an example data flow between the components of system 900. In particular embodiments, system 900 can include client system 930, social networking system 920*a*, and game networking system 920*b*. The components of system 900 can be connected to each other in any suitable configuration, using any suitable type of connection. The components may be connected directly or over any suitable network. Client system 930, social networking system 920*a*, and game networking system 920*b* can each have one or more corresponding data stores such as local data store 935, social data store 945, and game data store 965, respectively. Social networking system 920*a* and game networking system 920*b* can also have one or more servers that can communicate with client system 930 over an appropriate network. Social networking system 920*a* and game networking system 920*b* can have, for example, one or more internet servers for communicating with client system 930 via the Internet. Similarly, social networking system 920*a* and game networking system 920*b* can have one or more mobile servers for communicating with client system 930 via a mobile network (e.g., GSM, PCS, Wi-Fi, WPAN, etc.). In some embodiments, one server may be able to communicate with client system 930 over both the Internet and a mobile network. In other embodiments, separate servers can be used.

Client system 930 can receive and transmit data 923 to and from game networking system 920*b*. This data can include, for example, webpages, messages, game inputs, game displays, HTTP packets, data requests, transaction information, updates, and other suitable data. At some other time, or at the same time, game networking system 920*b* can communicate data 943, 947 (e.g., game state information, game system account information, page info, messages, data requests, updates, etc.) with other networking systems, such as social networking system 920*a* (e.g., Facebook, Myspace, etc.). Client system 930 can also receive and transmit data 927 to and from social networking system 920*a*. This data can include, for example, webpages, messages, social graph information, social network displays, HTTP packets, data requests, transaction information, updates, and other suitable data.

Communication between client system 930, social networking system 920*a*, and game networking system 920*b* can occur over any appropriate electronic communication medium or network using any suitable communications protocols. For example, client system 930, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TEL-NET, and a number of other protocols, may be used. In addition, a server in one interaction context may be a client in another interaction context. In particular embodiments, the information transmitted between hosts may be formatted as HyperText Markup Language (HTML) documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 920*b*, the BLOB containing the game state for the instance corresponding to the player can be transmitted to client system 930 for use by a client-side executed object to process. In particular embodiments, the client-side executable may be a FLASH-based game, which can de-serialize the game state data in the BLOB. As a player plays the game, the game logic implemented at client system 930 maintains and modifies the various game state parameters locally. The client-side game logic may also batch game events, such as mouse clicks, and transmit these events to game networking system 920*b*. Game networking system 920*b* may itself operate by retrieving a copy of the BLOB from a database or an intermediate memory cache (memcache) layer. Game networking system 920*b* can also de-serialize the BLOB to resolve the game state parameters and execute its own game logic based on the events in the batch file of events transmitted by the client to synchronize the game state on the server side. Game networking system 920*b* may then re-serialize the game state, now modified, into a BLOB and pass this to a memory cache layer for lazy updates to a persistent database.

With a client-server environment in which the online games may run, one server system, such as game networking system 920*b*, may support multiple client systems 930. At any given time, there may be multiple players at multiple client systems 930 all playing the same online game. In practice, the number of players playing the same game at the same time may be very large. As the game progresses with each player, multiple players may provide different inputs to the online game at their respective client systems 930, and multiple client systems 930 may transmit multiple player inputs and/or game events to game networking system 920*b* for further processing. In addition, multiple client systems 930 may transmit other types of application data to game networking system 920*b*.

In particular embodiments, a computed-implemented game may be a text-based or turn-based game implemented as a series of web pages that are generated after a player selects one or more actions to perform. The web pages may be displayed in a browser client executed on client system 930. As an example and not by way of limitation, a client application downloaded to client system 930 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 920a. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 930, either caused by an action of a game player or by the game logic itself, client system 930 may need to inform game networking system 920b of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 900 is discussed in reference to updating a multi-player online game hosted on a network-addressable system (such as, for example, social networking system 920a or game networking system 920b), where an instance of the online game is executed remotely on a client system 930, which then transmits application event data to the hosting system such that the remote game server synchronizes game state associated with the instance executed by the client system 930.

In particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 930 may include a Flash client. The Flash client may be configured to receive and run Flash application or game object code from any suitable networking system (such as, for example, social networking system 920a or game networking system 920b). In particular embodiments, the Flash client may be run in a browser client executed on client system 930. A player can interact with Flash objects using client system 930 and the Flash client. The Flash objects can represent a variety of in-game objects. Thus, the player may perform various in-game actions on various in-game objects by make various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 930, the Flash client may send the events that caused the game state changes to the in-game object to game networking system 920b. However, to expedite the processing and hence the speed of the overall gaming experience, the Flash client may collect a batch of some number of events or updates into a batch file. The number of events or updates may be determined by the Flash client dynamically or determined by game networking system 920b based on server loads or other factors. For example, client system 930 may send a batch file to game networking system 920b whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 930. In particular embodiments, the batch file may be a text file and the name-value pairs may be in string format.

In particular embodiments, when a player plays an online game on client system 930, game networking system 920b may serialize all the game-related data, including, for example and without limitation, game states, game events, user inputs, for this particular user and this particular game into a BLOB and stores the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 920b may retrieve the corresponding BLOB from the database to determine the most-recent values of the game-related data. In particular embodiments, while a player is playing the online game, game networking system 920b may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 10:
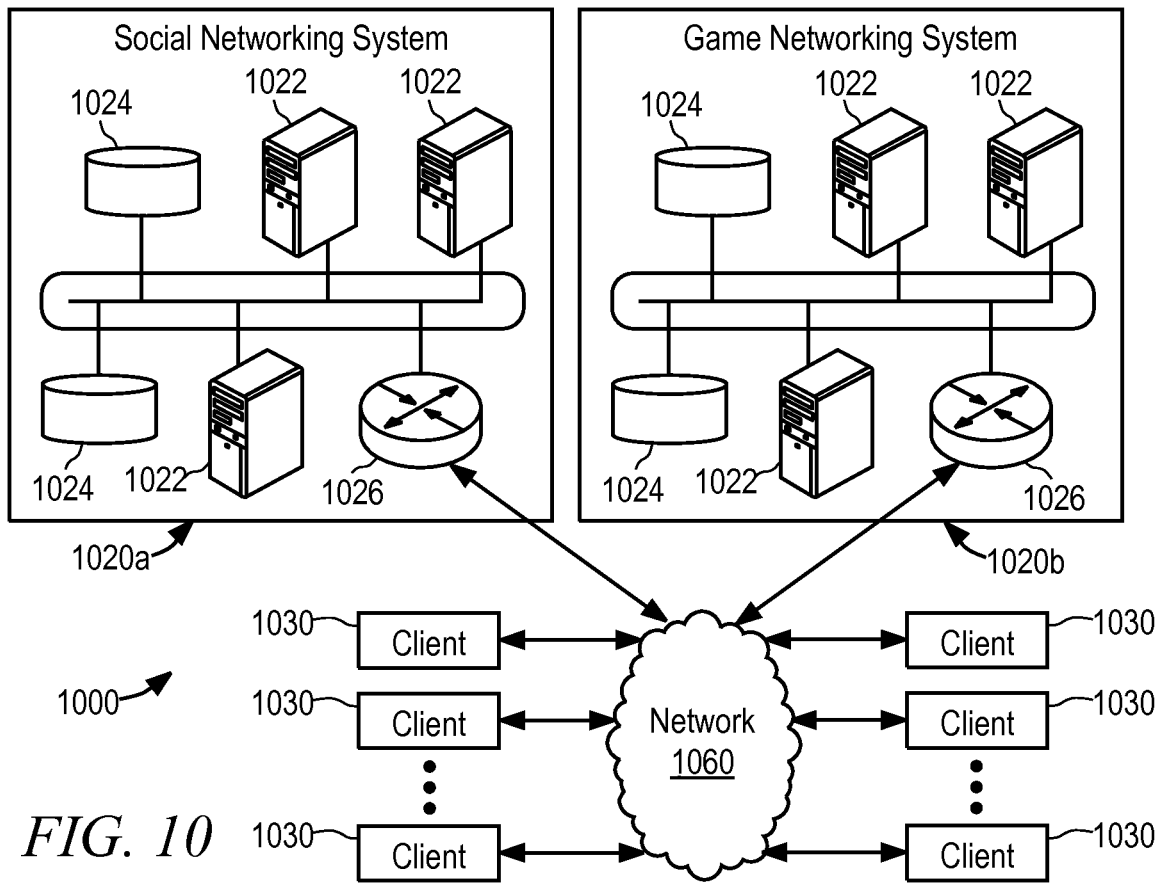
FIGS. 10-11 are schematic diagrams showing an example network environment, in which various example embodiments may operate, according to some example embodiments.

Particular embodiments may operate in a wide area network environment, such as the Internet, including multiple network addressable systems. FIG. 10 illustrates an example network environment, in which various example embodiments may operate. Network cloud 1060 generally represents one or more interconnected networks, over which the systems and hosts described herein can communicate. Network cloud 1060 may include packet-based wide area networks (such as the Internet), private networks, wireless networks, satellite networks, cellular networks, paging networks, and the like. As FIG. 10 illustrates, particular embodiments may operate in a network environment comprising one or more networking systems, such as social networking system 1020a, game networking system 1020b, and one or more client systems 1030. The components of social networking system 1020a and game networking system 1020b operate analogously; as such, hereinafter they may be referred to simply at networking system 1020. Client systems 1030 are operably connected to the network environment via a network service provider, a wireless carrier, or any other suitable means.

Networking system 1020 is a network addressable system that, in various example embodiments, comprises one or more physical servers 1022 and data stores 1024. The one or more physical servers 1022 are operably connected to computer network 1060 via, by way of example, a set of routers and/or networking switches 1026. In an example embodiment, the functionality hosted by the one or more physical servers 1022 may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers 1022 may host functionality directed to the operations of networking system 1020. Hereinafter servers 1022 may be referred to as server 1022, although server 1022 may include numerous servers hosting, for example, networking system 1020, as well as other content distribution servers, data stores, and databases. Data store 1024 may store content and data relating to, and enabling, operation of networking system 1020 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 1024 corresponds to one or more of a variety of separate and integrated databases, such as relational databases and object-oriented databases, that maintain information as an integrated collection of logically related records or files stored on one or more physical systems. Structurally, data store 1024 may generally include one or more of a large class of data storage and management systems. In particular embodiments, data store 1024 may be implemented by any suitable physical system(s) including components, such as one or more database servers, mass storage media, media library systems, storage area networks, data storage clouds, and the like. In one example embodiment, data store 1024 includes one or more servers, databases (e.g., MySQL), and/or data warehouses. Data store 1024 may include data associated with different networking system 1020 users and/or client systems 1030.

Client system 1030 is generally a computer or computing device including functionality for communicating (e.g., remotely) over a computer network. Client system 1030 may be a desktop computer, laptop computer, personal digital assistant (PDA), in- or out-of-car navigation system, smart phone or other cellular or mobile phone, or mobile gaming device, among other suitable computing devices. Client system 1030 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 1030 to enter addresses of specific network resources to be retrieved, such as resources hosted by networking system 1020. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 1030 desires to view a particular webpage (hereinafter also referred to as target structured document) hosted by networking system 1020, the user's web browser, or other document rendering engine or suitable client application, formulates and transmits a request to networking system 1020. The request generally includes a URL or other document identifier as well as metadata or other information. By way of example, the request may include information identifying the user, such as a user ID, as well as information identifying or characterizing the web browser or operating system running on the user's client computing device 1030. The request may also include location information identifying a geographic location of the user's client system or a logical network location of the user's client system. The request may also include a timestamp identifying when the request was transmitted.

Although the example network environment described above and illustrated in FIG. 10 described with respect to social networking system 1020a and game networking system 1020b, this disclosure encompasses any suitable network environment using any suitable systems. As an example and not by way of limitation, the network environment may include online media systems, online reviewing systems, online search engines, online advertising systems, or any combination of two or more such systems.

Figure 11:
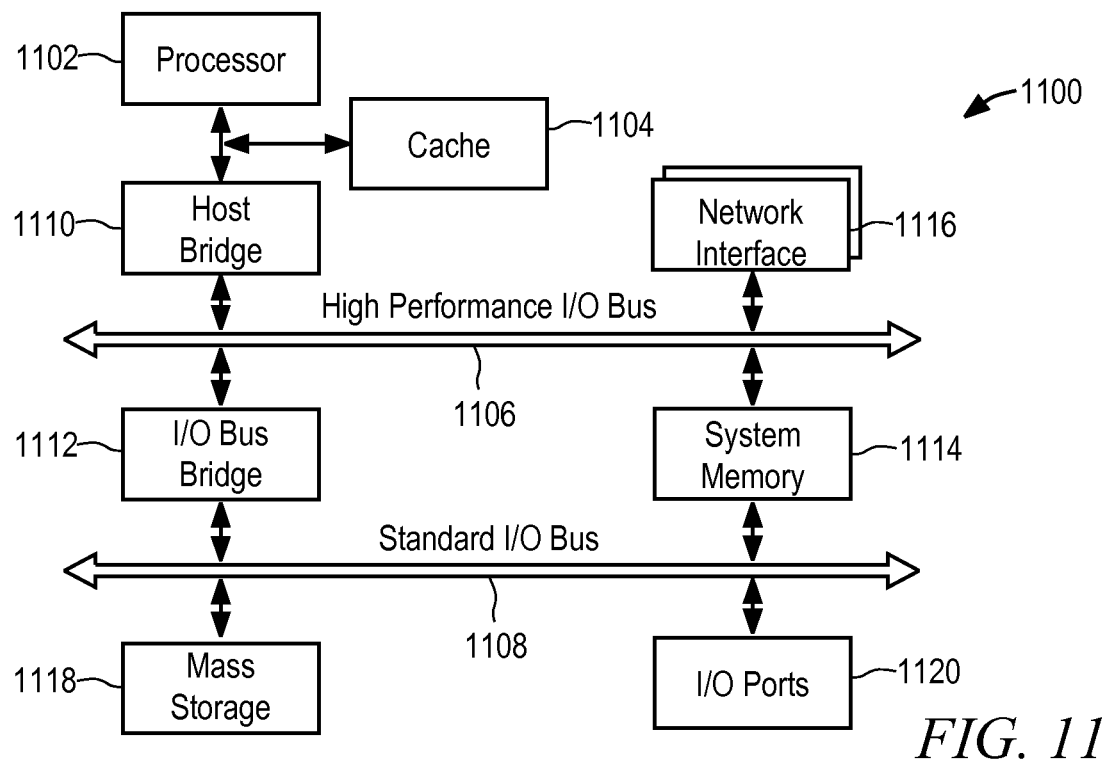

FIG. 11 illustrates an example computing system architecture, which may be used to implement a server 1022 or a client system 1030. In one embodiment, hardware system 1100 comprises a processor 1102, a cache memory 1104, and one or more executable modules and drivers, stored on a tangible computer readable medium, directed to the functions described herein. Additionally, hardware system 1100 may include a high performance input/output (I/O) bus 1106 and a standard I/O bus 1108. A host bridge 1110 may couple processor 1102 to high performance I/O bus 1106, whereas I/O bus bridge 1112 couples the two buses 1106 and 1108 to each other. A system memory 1114 and one or more network/communication interfaces 1116 may couple to bus 1106. Hardware system 1100 may further include video memory (not shown) and a display device coupled to the video memory. Mass storage 1118 and I/O ports 1120 may couple to bus 1108. Hardware system 1100 may optionally include a keyboard, a pointing device, and a display device (not shown) coupled to bus 1108. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 1100 are described in greater detail below. In particular, network interface 1116 provides communication between hardware system 1100 and any of a wide range of networks, such as an Ethernet (e.g., IEEE 802.3) network, a backplane, etc. Mass storage 1118 provides permanent storage for the data and programming instructions to perform the above-described functions implemented in servers 422, whereas system memory 1114 (e.g., DRAM) provides temporary storage for the data and programming instructions when executed by processor 1102. I/O ports 1120 are one or more serial and/or parallel communication ports that provide communication between additional peripheral devices, which may be coupled to hardware system 1100.

Hardware system 1100 may include a variety of system architectures and various components of hardware system 1100 may be rearranged. For example, cache 1104 may be on-chip with processor 1102. Alternatively, cache 1104 and processor 1102 may be packed together as a "processor module," with processor 1102 being referred to as the "processor core." Furthermore, certain embodiments of the present disclosure may not require nor include all of the above components. For example, the peripheral devices shown coupled to standard I/O bus 1108 may couple to high performance I/O bus 1106. In addition, in some embodiments, only a single bus may exist, with the components of hardware system 1100 being coupled to the single bus. Furthermore, hardware system 1100 may include additional components, such as additional processors, storage devices, or memories.

An operating system manages and controls the operation of hardware system 1100, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the invention can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A method comprising:

detecting actions of a player character in a race event of a computer-implemented game, the player character being controlled by a player via a client device;

generating a player character movement model based on the actions of the player character in the race event, the character movement model defining:

a path travelled by the player character along a course in the race event; and a race completion time for the player character in the race event;

by one or more processors of a machine, based at least in part on the player character movement model, generating a non-player character movement model such that the non-player character movement model defines at least one of:

a modified path different from the path defined by the player character movement model; and a modified race completion time different from the race completion time of the player character movement model; and subsequent to termination of the race event, in a further race event comprising competitive travel along the course by the player character and a non-player character, automatically controlling movement of the non-player character according to the non-player character movement model such that the non-player character performs a set of non-player actions providing for non-player character race behavior selected from the group comprising:

completing the further race event in the modified race completion time defined by the non-player character movement model, while traveling along a path identical to the path defined by the player character movement model; and completing the further race event in a race completion time identical to the race completion time defined by the player character movement model while traveling along the modified path defined by the non-player character movement model.

2. The method of claim 1, further comprising:

receiving a request to begin the further race event; and displaying the non-player character in the further race event of the game in response to receipt of the request, the non-player character and the player character being shown in head-to-head competition in the further race event.

3. The method of claim 1, wherein the non-player character movement model defines completion of the course along the path of the player character movement model in the modified race completion time.

4. The method of claim I, wherein the non-player character movement model defines completion of the course in the race completion time of the player character movement model along the modified path of the non-player character movement model.

5. A system comprising:

one or more computer processors; and memory having stored thereon machine-readable instructions to configure the one or more computer processors, when executing the instructions, to perform operations comprising:

detecting actions of a player character in a race event of a computer-implemented game, the player character being controlled by a player via a client device;

generating a player character movement model based on the actions of the player character in the race event, the player character movement model defining:

a path travelled by the player character along a course in the race event; and a race completion time for the player character in the race event;

based at least in part on the player character movement model, generating a non-player character movement model such that the non-player character movement model defines at least one of:

a modified path different from the path defined by the player character movement model; and a modified race completion time different from the race completion time of the player character movement model; and subsequent to termination of the race event, in a further race event comprising competitive travel along the course by the player character and a non-player character, automatically controlling movement of the non-player character according to the non-player character movement model such that the non-player character performs a set of non-player actions providing for non-player character race behavior selected from the group comprising:

completing the further race event in the modified race completion time defined by the non-player character movement model, while traveling along a path identical to the path defined by the player character movement model; and completing the further race event in a race completion time identical to the race completion time defined by the player character movement model while traveling along the modified path defined by the non-player character movement model.

6. The system of claim 5, wherein the instructions further configure the one or more computer processors to:

receive a request to begin the further race event; and display the non-player character in the further race event of the game in response to receipt of the request, the non-player character and the player character being shown in head-to-head competition in the further race event.

7. The system of claim 5, wherein non-player character movement model defines completion of the course in the race completion time of the player character movement model along the modified path.

8. The system of claim 5, wherein the non-player character movement model defines completion of the course along the path of the player character movement model in the modified time.

9. A non-transitory machine-readable medium storing instructions that, when executed by one or more processors of a machine, cause the machine to perform operations comprising detecting actions of a player character in a race event of a computer-implemented game, the player character being controlled by a player via a client device;

generating a player character movement model based on the actions of the player character in the race event, the character movement model defining:

a path travelled by the player character along a course in the race event; and a race completion time for the player character in the race event;

by one or more processors of a machine, based at least in part on the player character movement model, generating a non-player character movement model such that the non-player character movement model defines at least one of:
   a modified path different from the path defined by the player character movement model; and
   a modified race completion time different from the race completion time of the player character movement model; and.
subsequent to termination of the race event, in a further race event comprising competitive travel along the course by the player character and a non-player character, automatically controlling movement of the non-player character according to the non-player character movement model such that the non-player character performs a set of non-player actions providing for non-player character race behavior selected from the group comprising:
   completing the further race event in the modified race completion time defined by the non-player character movement model, while traveling along a path identical to the path defined by the player character movement model; and
completing the further race event in a race completion time identical to the race completion time defined by the player character movement model while traveling along the modified path defined by the non-player character movement model.

* * * * *

UNITED STATES PATENT AND TRADEMARK OFFICE
CERTIFICATE OF CORRECTION

| | | |
|---|---|---|
| PATENT NO. | : 11,241,626 B2 | Page 1 of 1 |
| APPLICATION NO. | : 14/502085 | |
| DATED | : February 8, 2022 | |
| INVENTOR(S) | : Lall et al. | |

It is certified that error appears in the above-identified patent and that said Letters Patent is hereby corrected as shown below:

On the Title Page

In Column 2, Item (56) under "Other Publications", Line 1, delete "kNIGHTWINGO1" and insert --kNIGHTWING01-- therefor In the Specification In Column 3, Line 18, delete "120" and insert --120a-- therefor In Column 10, Line 58, after "characters", delete "may"

In Column 13, Line 12, delete "935," and insert --925,-- therefor

In Column 19, Line 33, delete "422," and insert --1022,-- therefor

In the Claims

In Column 21, Line 54, in Claim 4, delete "claim I," and insert --claim 1,-- therefor In Column 22, Line 57, in Claim 9, after "comprising", insert --:--

In Column 23, Line 10, in Claim 9, delete "and." and insert --and-- therefor

Signed and Sealed this
Twenty-eighth Day of June, 2022

*Katherine Kelly Vidal*

Katherine Kelly Vidal
*Director of the United States Patent and Trademark Office*